(12) United States Patent
Neumann

(10) Patent No.: US 12,067,524 B2
(45) Date of Patent: Aug. 20, 2024

(54) METHOD AND SYSTEM FOR MODIFYING A PHYSICAL TRANSFER PATH

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 712 days.

(21) Appl. No.: 17/221,359

(22) Filed: Apr. 2, 2021

(65) Prior Publication Data
US 2022/0067657 A1    Mar. 3, 2022

Related U.S. Application Data

(63) Continuation-in-part of application No. 17/007,302, filed on Aug. 31, 2020, now Pat. No. 11,055,655.

(51) Int. Cl.
| | |
|---|---|
| *G06Q 10/0835* | (2023.01) |
| *G06N 3/08* | (2023.01) |
| *G06Q 10/047* | (2023.01) |
| *G06Q 10/0833* | (2023.01) |
| *H04W 4/021* | (2018.01) |
| *H04W 4/029* | (2018.01) |

(52) U.S. Cl.
CPC ......... *G06Q 10/08355* (2013.01); *G06N 3/08* (2013.01); *G06Q 10/047* (2013.01); *G06Q 10/0833* (2013.01); *H04W 4/021* (2013.01); *H04W 4/029* (2018.02)

(58) Field of Classification Search
CPC .......... G06Q 10/08355; G06Q 10/047; G06Q 10/0833; H04W 4/029; H04W 4/021; G06N 3/08

See application file for complete search history.

(56) References Cited

U.S. PATENT DOCUMENTS

2019/0228375 A1 *   7/2019   Laury .................. G05D 1/0088

* cited by examiner

*Primary Examiner* — Michael D Lang
(74) *Attorney, Agent, or Firm* — Caldwell Intellectual Property Law

(57) ABSTRACT

In an aspect, a system for modifying a physical transfer path includes a computing device configured to generate an initial physical transfer path, wherein generating further comprises receiving a request for an alimentary combination, determining a first transfer party as a function of a geolocation area, determine a trouble state as a function of the initial physical transfer path, wherein determining further comprises receiving a delayed delivery notification, and determining the trouble state as a function of the delayed delivery notification and the initial physical transfer path using a trouble machine-learning model, and produce a modified physical transfer path, wherein producing further comprises receiving a delivery time threshold, identifying an alternate transfer party as a function of the trouble state, and producing the modified physical transfer path as a function of the delivery time threshold and the alternate transfer party using a transfer machine-learning model.

20 Claims, 8 Drawing Sheets

METHOD AND SYSTEM FOR MODIFYING A PHYSICAL TRANSFER PATH

CROSS-REFERENCE TO RELATED APPLICATIONS

This application is a continuation-in-part of Non-provisional application Ser. No. 17/007,302 filed on Aug. 31, 2020 and entitled "METHOD AND SYSTEM FOR GENERATING AN ALIMENTARY COMBINATION HELP UPDATE," the entirety of which is incorporated herein by reference.

FIELD OF THE INVENTION

The present invention generally relates to the field of machine-learning. In particular, the present invention is directed to a system and method for modifying a physical transfer path.

BACKGROUND

Data management using artificial intelligence and machine-learning solutions help to optimize data management and processes which helps to reduce human error. There has been a lack of resources to aid a user when a problem arises.

SUMMARY OF THE DISCLOSURE

In an aspect, a system for modifying a physical transfer path includes a computing device configured to generate an initial physical transfer path, wherein generating further comprises receiving a request for an alimentary combination, determining a first transfer party as a function of a geolocation area, and generating the initial physical transfer path as a function of the request for an alimentary combination and the first transfer party, determine a trouble state as a function of the initial physical transfer path, wherein determining further comprises receiving a delayed delivery notification, and determining the trouble state as a function of the delayed delivery notification and the initial physical transfer path using a trouble machine-learning model, and produce a modified physical transfer path as a function of the trouble state, wherein producing further comprises receiving a delivery time threshold, identifying an alternate transfer party as a function of the trouble state, and producing the modified physical transfer path as a function of the delivery time threshold and the alternate transfer party using a transfer machine-learning model.

In another aspect, a method for modifying a physical transfer path includes generating, by a computing device, an initial physical transfer path, wherein generating further comprises receiving a request for an alimentary combination, determining a first transfer party as a function of a geolocation area, and generating the initial physical transfer path as a function of the request for an alimentary combination and the first transfer party, determining, by the computing device, a trouble state as a function of the initial physical transfer path, wherein determining further comprises receiving a delayed delivery notification, and determining the trouble state as a function of the delayed delivery notification and the initial physical transfer path using a trouble machine-learning model, and producing, by the computing device, a modified physical transfer path as a function of the trouble state, wherein producing further comprises receiving a delivery time threshold, identifying an alternate transfer party as a function of the trouble state, and producing the modified physical transfer path as a function of the delivery time threshold and the alternate transfer party using a transfer machine-learning model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for modifying a physical transfer path when a problem arises with a delivery of an alimentary combination. The modification can identify an alternate transfer party to be identified as a function of a trouble state. The disclosure can modify the physical transfer path as a function of a delivery time threshold and a machine-learning model.

Figure 1A:
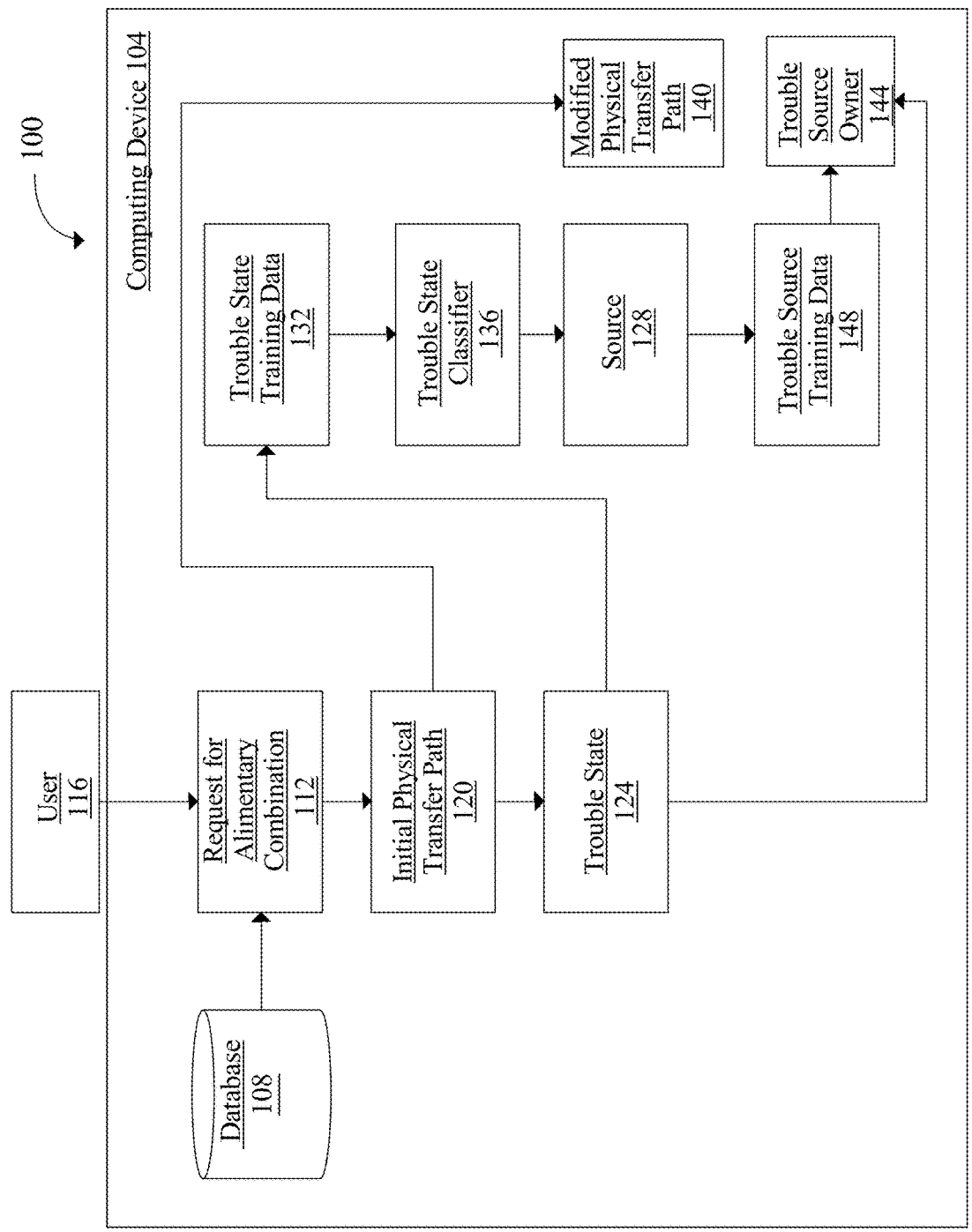
FIG. 1A is a block diagram of an exemplary embodiment of a system generating an alimentary combination help update.

Referring now to FIG. 1A, an exemplary embodiment of a system 100 for generating an alimentary combination help update is illustrated. System 100 may be used for any type of product or service ordered which may require delivery to a user. The orders may include, but not limited to, delivery of prescription drugs, electronics, and/or services such as plumbing, installation of utilities, and the like. System includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1A, computing device 104 may connect to and/or include a database 108. Database 108 may be implemented, without limitation, as a relational database 108, a key-value retrieval database 108 such as a NOSQL database 108, or any other format or structure for use as a database 108 that a person skilled in the art would recognize as suitable upon review of the entirety of this disclosure. Database 108 may alternatively or additionally be implemented using a distributed data storage protocol and/or data structure, such as a distributed hash table or the like. Database 108 may include a plurality of data entries and/or records as described above. Data entries in a database 108 may be flagged with or linked to one or more additional elements of information, which may be reflected in data entry cells and/or in linked tables such as tables related by one or more indices in a relational database 108. Persons skilled in the art, upon reviewing the entirety of this disclosure, will be aware of various ways in which data entries in a database 108 may store, retrieve, organize, and/or reflect data and/or records as used herein, as well as categories and/or populations of data consistently with this disclosure. In some embodiments, network data, or other information such as user information, transfer party information, and alimentary provider information, may be stored in and/or retrieved from database 108.

Figure 2:
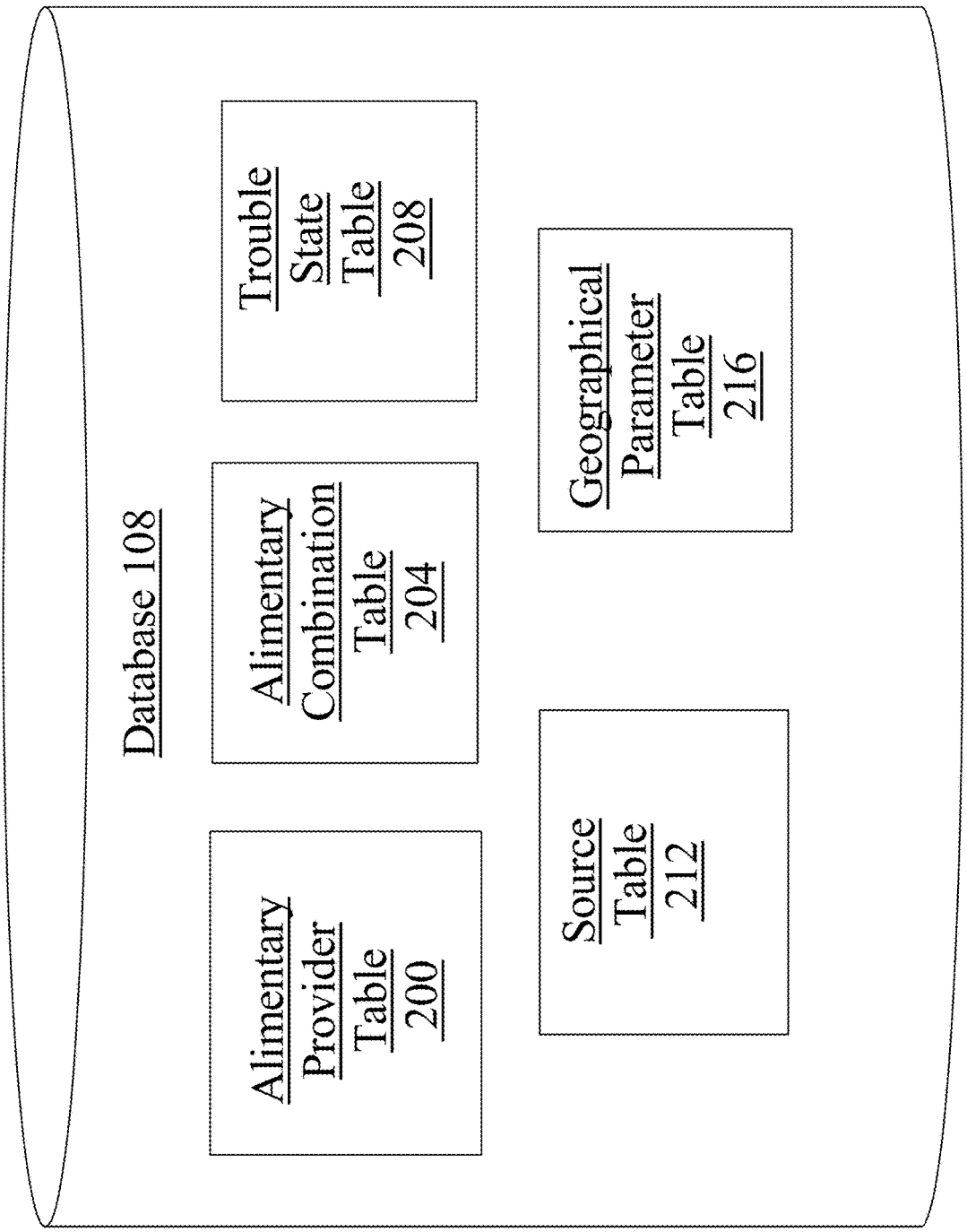
FIG. 2 is a block diagram of an exemplary embodiment of a database.

Referring now to FIG. 2 an exemplary embodiment of a database 108 is illustrated. Database 108 may, as a non-limiting example, organize data stored in the database according to one or more database tables. One or more database tables may be linked to one another by, for instance, common column values. For instance, a common column between two tables of database 108 may include an identifier of a first alimentary provider, for instance as defined below; as a result, a query may be able to retrieve all rows from any table pertaining to a given first alimentary provider. Other columns may include any other category usable for organization or subdivision of data, including types of data, common pathways between, for example, an alimentary combination and a first alimentary provider, or the like; persons skilled in the art, upon reviewing the entirety of this disclosure, will be aware of various ways in which expert data from one or more tables may be linked and/or related to expert data in one or more other tables.

Still referring to FIG. 2, one or more database tables in database 108 may include, as a non-limiting example, an alimentary provider table 200, which may be used to store records and attributes related to alimentary providers. This may include, but not limited to, names of alimentary providers, type of cuisine, or the like. As another non-limiting example, one or more tables in database 108 may include alimentary combination table 204 which may be used to store attributes of alimentary combinations such as, but not limited to, time of preparation, allowed ingredient substitutions, or the like. As another non-limiting example, one or more tables in database 108 may include a trouble state table 208. A trouble state table 208 may include, but not limited to trouble states that may impact delivery of an alimentary combination to user 116, information on frequency of occurrence, and the like. As another non-limiting example, one or more tables in database 108 may include trouble source table 212. A trouble source table 212 may include sources of potential trouble states, correction parameters, and the like. As another non-limiting example, one or more tables in database 108 may include trouble source owner table 216. A trouble source owner table 216 may include, but not limited to, a listing of potential owners of trouble state, contact information, frequency of occurrence, and the like.

Still referring to FIG. 1A, computing device 104 is configured to receive a request for an alimentary combination 112 from user 116. An "alimentary combination" is defined for the purposes of this disclosure as a combination of ingredients that an alimentary provider and/or alimentary provider device indicates may be provided, for instance and without limitation in the form of a meal. As used in this disclosure, "alimentary providers" may include any entities that prepare alimentary combinations. As a non-limiting example, alimentary providers may prepare alimentary combinations at a restaurant. Other such alimentary providers may include any combination of one or more of the following: restaurants, bars, cafes, or other vendor of food or beverages, such as a hotel. As an example, a user 116 may order a pepperoni pizza from a pizza restaurant. User 116 may select to have the pizza delivered to any location, such as but not limited to, the user's residence, the user's workplace, or the like. The delivery may take place by transfer party directly employed by the alimentary provider. A "transfer party," as defined in this disclosure, is a person and/or device that transports alimentary combinations to one or more users requesting alimentary combinations. Transfer party may be on foot, or traveling by vehicle, such as a car, scooter, bicycle, etc. One or more transfer parties may be directed to one or more alimentary providers to receive an order placed by users and deliver the orders to the users located at corresponding destinations, which may include without limitation residential or commercial addresses. User 116 may select a third-party delivery service such as, but not limited to, Uber Eats®, Grubhub®, DoorDash®, and the like. Alternatively, user 116 may select to pick up the pizza at the location of the alimentary provider. A user may include a single human being. User 116 may include a plurality of human beings.

Still with reference to FIG. 1A, computing device may generate an initial physical transfer path 120 as a function of the request for an alimentary combination 112. As used in this disclosure, a "physical transfer path" is a path that a transfer party may take to deliver the alimentary combination to the user. As a non-limiting example, computing device may generate an initial physical transfer path 120 as a function of the physical distance between the alimentary provider and user 116. An initial physical transfer path 120 may include a path to an aggregation depot. As used in this disclosure, an "aggregation depot" is defined as a centralized drop-off location of, for example, alimentary combinations, where the different alimentary combinations may be aggregated so they may be delivered to a plurality of users. An initial physical transfer path 120 may include a path selected as a function of delivery parameters such as traffic conditions, weather, and the like. An initial physical transfer path 120 may be generated as a function of the alimentary combination. For example, an initial physical transfer path 120 for an alimentary combination that includes highly perishable items may be different than an initial delivery path 120 of non-perishable alimentary combinations to the same user. Initial physical transfer path 120 may include a path that includes for the transfer of alimentary combinations to a plurality of users. As an example, an initial physical transfer path 120 generated for the transfer of an alimentary combination to a user may be the same path used for the transfer of alimentary combinations to other users.

With continued reference to FIG. 1A, computing device 104 is configured to identify a trouble state 124 as a function of the request for the alimentary combination. As used in this disclosure, a "trouble state" is a state that may result from a condition that may affect, for example, the delivery of the alimentary combination to user 116. This condition may result in a deviation from the predicted delivery time potentially causing a delay of delivery of alimentary combination to user 116. Trouble state 124 may arise from any condition that may cause the deviation from the predicted delivery time. Trouble state 124 may also be the result of a behavior or a plurality of behaviors from any party involved with the delivery of the alimentary combination such as, but not limited to, user 116, alimentary provider, a third-party transfer party, and the like. For example, a transfer party may encounter an unexpected traffic situation while in route to user 116. A transfer party may communicate the traffic situation. Computing device 104 may identify the trouble state 124 as "late." In another non-limiting example, a transfer party may be traveling in a vehicle that experiences mechanical problems. Computing device 104 may identify trouble state 124 as "undeliverable," "need assistance," and the like.

Alternatively or additionally, and still referring to FIG. 1A, in an embodiment, identifying a trouble state 124 further comprises determining a physical transfer route for the alimentary combination. The determination and optimization of delivery routes may be implemented, without limitation, as disclosed in U.S. Nonprovisional application Ser. No. 16/890,339, filed on Jun. 2, 2020, and entitled, "METHODS AND SYSTEMS FOR PATH SELECTION USING VEHICLE ROUTE GUIDANCE," and U.S. Nonprovisional application Ser. No. 16/919,573, filed on Jul. 2, 2020, and entitled "A METHOD AND SYSTEM FOR SELECTION OF A PATH DELIVERIES;" each of U.S. Nonprovisional application Ser. No. 16/890,339 and U.S. Nonprovisional application Ser. No. 16/919,573 is incorporated by reference herein in its entirety. Selecting a delivery route may be a function of, for example, the weather, traffic conditions, road construction, and the like, which may lead to a physical transfer route that is not the shortest but may be the fastest.

Still referring to FIG. 1A, identifying a trouble state 124 includes generating a predicted time of delivery as a function of a physical transfer path. As used in this disclosure, "predicted time of delivery" is the time it may take a transfer party to get from the location of the alimentary provider to the location of the user. The predicted delivery time may be based on the same factors that may be used to determine a physical transfer path. Physical path priority may correspond to how soon an order will be ready for delivery. In other words, the physical path priority may correspond to a time at which a given order is likely to be available for delivery to user 116 based for instance on assembly times by the alimentary provider, as well as on a time at which an order was initiated. Projected lateness of a route may correspond to the difference in time between an estimated delivery time initially projected for a physical path and an estimated delivery time, such as delivery event, which may be predicted by a system based on updates received. In some embodiments, an estimated delivery time projected for a physical path may be determined based on real-time traffic information and other geographic data items; this may also be determined based on historical transfer party performance data. In some embodiments, if the projected physical path delivery time is later than a predicted and/or requested time for delivery, then the route may be assigned a lower score. By contrast, if a projected route delivery time is earlier than a requested and/or predicted time for delivery, then a route may be assigned a higher score. In some embodiments, an estimated delivery time projected by a route may be compared to a predetermined time threshold; if a projected delivery time is beyond the time threshold, the route may be given a zero score.

As a non-limiting example, a physical transfer route may be determined based on traffic conditions; the impact of those traffic conditions may be reflected in the determination of the predicted time of delivery. Other factors may have an impact which may not be reflected in the predicted delivery time. For example, user 116 may reside in a common ownership community such as a condominium. Transfer party may have to park at a distance from the location of the user and may have to walk to get to the location of user 116, hence, delaying the delivery of the alimentary combination. The predicted delivery time may not reflect for other issues transfer party may experience. For example, the alimentary provider may be in an urban area where it may be difficult to park. Another non-limiting example may include the alimentary combination may not be ready when transfer party arrives at the location of the alimentary provider.

With continued reference to FIG. 1A, identifying a trouble state 124 includes computing a trouble state cause. As used in this disclosure, a "trouble state cause" is the cause of a discrepancy between the predicted delivery time and the actual delivery time. As used in this disclosure, "actual delivery time" is the time when an alimentary combination arrives at user's selected location for delivery to occur. Actual delivery time may be computed as the time transfer party arrives at user 116 location. Actual delivery time may be computed as the time transfer party hands alimentary combination to user 116. Computing a trouble state 124 includes receiving a delayed delivery notification. As an example, a user may receive a delayed delivery notification that the alimentary combination ordered may be thirty minutes later than the predicted time. Trouble state may indicate that the food will be "late." Trouble state cause may be due, for example, to too many orders at the alimentary combination provider. Another non-limiting trouble state cause may indicate that the transfer party was 30 minutes late arriving at the alimentary provider.

Alternatively or additionally, and still referring to FIG. 1A, computing the trouble state cause includes training a machine-learning process using trouble state cause training data 132 correlating delayed delivery notification to a trouble state cause. Trouble state cause will be outputted as a function of the delayed delivery notification and the machine-learning process, for instance as described below.

Figure 3:
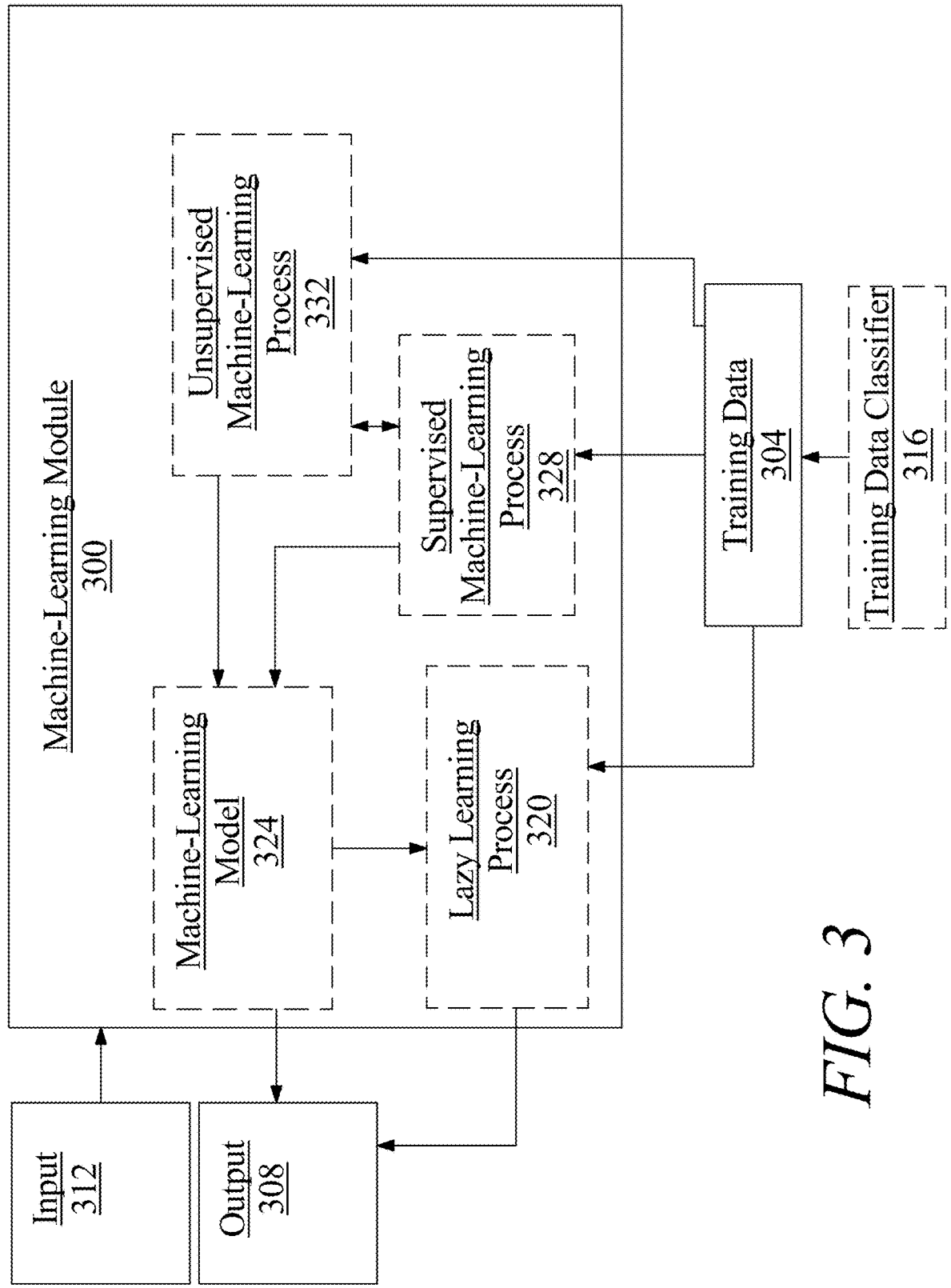
FIG. 3 is a block diagram of an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, computing device may receive as delayed delivery notifications as inputs and outputs a trouble state cause.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to, for example, a trouble state based on training data correlating trouble state 124 with sources as described in further detail below.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance in an embodiment, a supervised learning algorithm may identify a trouble state cause which may include outputting the trouble state cause using delayed delivery notification as an input and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 304.

Referring back to FIG. 1A, computing device 104 is configured to classify the trouble state 124 to at least a source 128. Computer device 104 receives trouble state training data 132 where the trouble state training data 132 correlates the trouble state with sources. As used in this disclosure, a "source" is the person, place, or instrumentality that causes the trouble. For example, a problem with a delivery vehicle may show an example where the source of trouble is an instrumentality. Another non-limiting example of a source of trouble may include the failure of a transfer party to show and pick up the alimentary combination at the alimentary provider. A trouble state classifier 136 may be trained as a function of the trouble state training data 132. Training data and classifiers are discussed above. As an example, the trouble state classifier 136 and the trouble state 124 may serve as inputs which outputs the at least a source 128. Training state training data 132 may be compiled from past user interactions where trouble states correlate to sources. For example, a trouble state of "late delivery due to traffic" may have a source of "transfer party." Past user interactions may indicate that a trouble state of late may be correlated with the transfer party. As another example, a trouble state of "late delivery due to rush of orders" may be correlated to a source identified as an alimentary provider. The past user interactions may be used to update training data 132.

Still referring to FIG. 1A, in an embodiment, computing device 104 is configured to update the trouble state training data 132 by incorporating the user 116 input related to the trouble state 124 into the trouble state training data 132. Examples of user input may include, but not limited to, road conditions that may be unknown to transfer party, sudden weather changes, delivery made to an incorrect location due to similarities in user 116 locations, and the like. As a non-limiting example, a user 116 may have received a trouble state 124 that alimentary combinations may be late due to a known road construction project. User 116 may send input related to the road construction which may be incorporated into trouble state training data 132. A future request originating from a location near the construction project may show a trouble state 116 and source 128 as "late due to construction project." User 116 input may be used to generate a new trouble state classifier 136 based on updated training data 132.

Still referring to FIG. 1A, in an embodiment, computing device 104 is configured to sort the trouble state 124 as a function of the alimentary combination. For example, user 116 may request an alimentary combination that includes a perishable item like raw milk or may request that the alimentary combination include milk as a standalone beverage. Perishable items may receive a higher priority over non-perishable items. As an example, a trouble state 124 indicating that an alimentary combination may be late may have a higher priority over an item that may be in a trouble state 124 late, but the alimentary combination may only include non-perishable items such as, but not limited to raw fruits and vegetables. In this instance, computing device 104 may schedule delivery of the alimentary combination that may include perishable items ahead of the alimentary combination that includes non-perishable items.

Still referring to FIG. 1A, computer device 104 is configured to generate a modified physical transfer path 140 as a function of the initial physical transfer path 120 and the source 128. As used in this disclosure, a "modified physical transfer path" is a physical transfer path that may differ from the initial physical transfer path. The modified physical transfer 140 may be selected, for example, if trouble state 116 may delay the delivery of an alimentary combination to user 116 by an amount of time that exceeds a delivery time threshold value. As an example, if the delivery time threshold value is 30 minutes, and a trouble state where there is no transfer party available to deliver the alimentary combination to user 116 exceeds the delivery time threshold value, modified physical transfer path 140 may be selected instead of initial physical transfer path 120, where the modified physical transfer path 140 may include a new transfer party. Modified physical transfer path 140 may include a single transfer party making a single delivery of an alimentary combination. Modified physical transfer path 140 may include a single transfer party making a plurality of deliveries along modified transfer path 140.

Still referring to FIG. 1A, in an embodiment, computer 104 may generate a modified physical transfer path 140 by generating a modified physical transfer path 140 from a plurality of modified physical transfer paths as a function of the trouble state 124 and location of the user 116. As an example, user 116 may have requested an alimentary combination which may be in trouble state of "late." Modified physical transfer path 140 may be generated from a plurality of modified physical transfer paths to reduce the amount of time for the late delivery by selecting a modified physical transfer path that is based on the location of the user 116. For example, modified physical transfer path may be less congested than the initial physical transfer path 120 which may reduce the amount of time by which the alimentary combination is late. Modified physical transfer route 140 may be selected based on a new location provided by user 116. For example, to reduce the amount of time by which the alimentary combination is late, user 116 may choose to change their location to a location closer to the location of the alimentary combination. Additionally, generating a modified transfer path 140 for delivery for the alimentary combination may include updating the predicted time of delivery as a function of the location of the alternate delivery route. For example, user 116 may receive a projected time of delivery based on the request for the alimentary combination. User 116 may receive an updated projected time of delivery based on selection of modified physical transfer path 140 based on user's location and source of trouble.

Figure 1B:
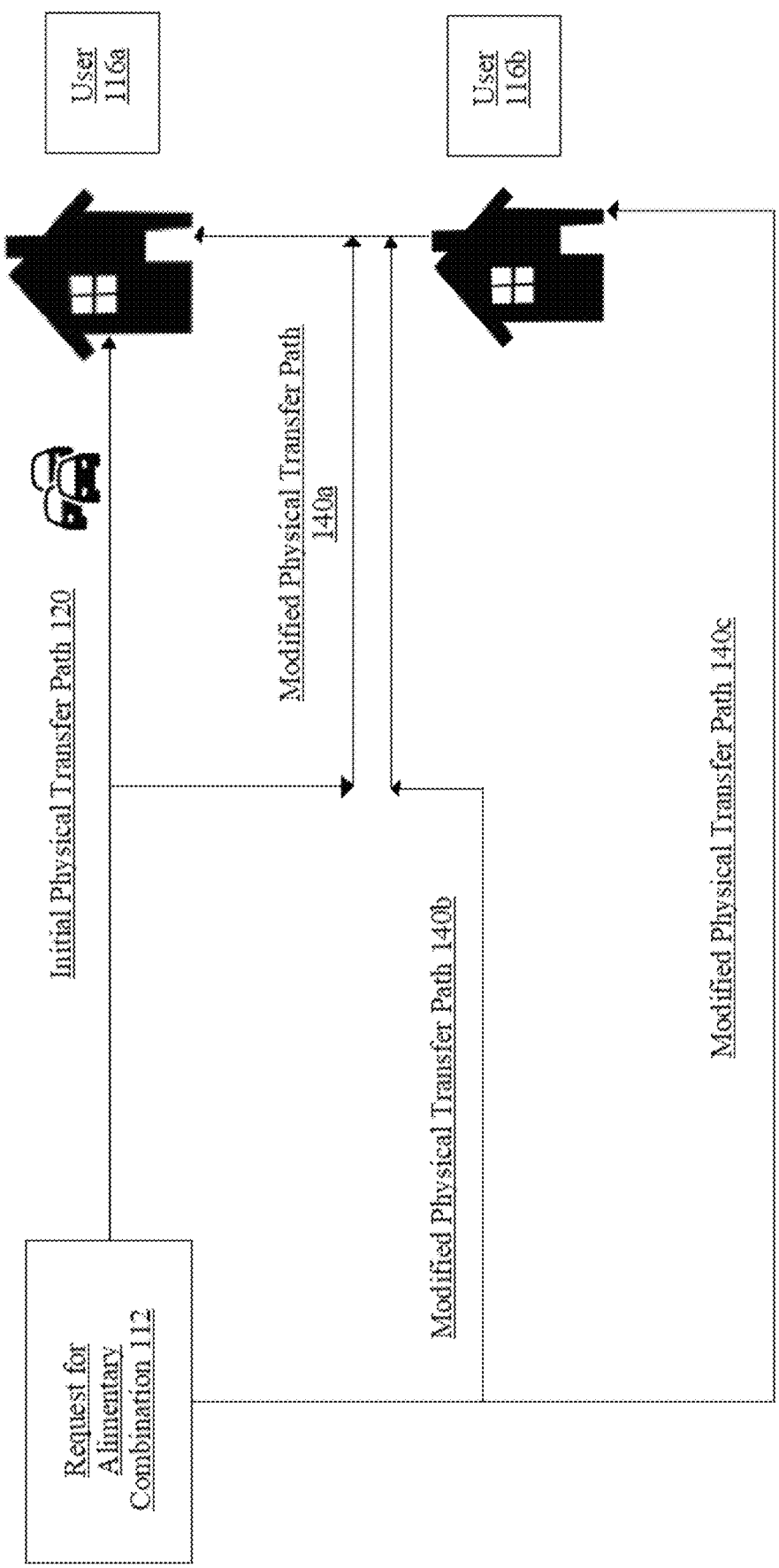
FIG. 1B is a flow diagram illustrating an exemplary embodiment of a method of path selection.

Now referring to FIG. 1B, an exemplary embodiment of how computing device 104 generates a modified physical transfer path 140 is demonstrated. As a non-limiting example, user 116a makes a request for an alimentary combination 112 from an alimentary provider. An initial physical transfer path 120 is selected for transfer of the alimentary combination from the alimentary provider to user 116a. A transfer party takes the alimentary combination from an alimentary provider to user 116a using initial physical transfer 120. Transfer party may experience a delay based on traffic conditions, weather, and the like along initial physical transfer path 120. Modified physical transfer path 140 may be generated based on, for example, the proximity of the alimentary provider to user 116a. Based on selection of modified physical transfer path 140a, the predicted time of delivery may be updated. Alternatively, modified physical transfer path 140b may be generated, based on, for example, a shorter transfer time based on traffic conditions, and the like. Based on selection of modified physical transfer path 140b, the predicted time of delivery may be updated. Alternatively, an alternate transfer party may be selected to deliver the alimentary combination to user 116a. Alternate transfer party may combine deliveries to reduce the delivery times. Modified physical transfer path 140c may be selected for the alternate transfer party to deliver the alimentary combination to user 116a. Alternate transfer party, for example, may deliver an alimentary combination to user 116b followed by delivery to user 116a. Based on selection of modified physical transfer path 140c, the predicted time of delivery may be updated.

Alternative or additionally, and still referring to FIG. 1A, in another embodiment, computing device 104 is configured to present modified physical transfer route 140 to the user as a function of the user preferences. As used in this disclosure, "user preferences" are settings that the user can exercise control and configure as needed. Examples of user preferences include, but are not limited to, methods of receiving a predicted time of delivery; methods of receiving delivery status updates; methods of receiving modified physical transfer route; methods of receiving an updated predicted time of delivery, and the like. User 116 may configure to enable or disable user preferences. In another example, user 116 may configure any user device to receive updates regarding the request for an alimentary combination. User 116 may choose to receive, for example, updated projected time of delivery in the form of a text, phone call, email, and the like. User 116, upon receiving an updated projected time of delivery in the form of a text or an email may send a transmission back which may include a cancellation for the request of the alimentary combination. In an embodiment, the request for the alimentary combination is updated as a function of the trouble state and the source. As a non-limiting example, the request for the alimentary combination may be updated to include information as to the source and the reason for the updated delivery time. User 116 may choose to view simple details for the reason such as the updated delivery time. User 116 may also choose to view expanded details which may include, but not limited to, the reason for the update and the modified physical transfer path that a transfer party may use.

Alternatively or additionally, and still referring to FIG. 1A in another embodiment, computing device 104 is configured to initiate a user alert communication as a function of the modified physical transfer route 140. As a non-limiting example, computing device 104 may initiate, for example, a phone call between user 116 and the alimentary combination provider, the transfer party, and the like. User 116 may receive user alert communication in any mobile device such as, but not limited to, a smartphone, tablet device, laptop computer, and the like. For example, a transfer party may choose to initiate a user alert communication with user 116 and give user 116 an updated predicted time of arrival based on delivery parameters such as, but not limited to, traffic and weather experienced by the transfer party by using modified physical transfer route 140.

Still referring to FIG. 1A, in an embodiment generating a modified physical transfer path 140 may include selecting an alternate transfer party from a plurality of transfer party as a function of the trouble state and location of the alternate transfer party. As an example, user 116 may have requested an alimentary combination which may be in trouble state of "late." Modified physical transfer path 140 may be generated from a plurality of transfer party to reduce the amount of time for the late delivery by selecting a modified physical transfer path that is based on the location of a transfer party. An alternate transfer party different from a first transfer party assigned to deliver the alimentary combination may be selected from a plurality of transfer party based on the proximity of the alternate transfer party to the location of the first transfer party. For example, delivering an alimentary combination to user 116 by first transfer party using the modified physical path may delay deliveries to all users within the modified physical path. The selection of an alternate transfer party may improve the delivery time for user 116 as alternate transfer party may be able to go to straight to user 116 rather than making additional stops that may be prescribed in the modified physical transfer path. Generating a modified physical transfer path 140 may include updating the predicted time of delivery as a function of the location of the alternate transfer party. For example, user 116 may receive a projected time of delivery based on the request for the alimentary combination. User 116 may receive an updated projected time of delivery based on selection of modified physical transfer path 140 based on of the trouble state and location of the alternate transfer party.

Still referring to FIG. 1A, in an embodiment generating a modified physical transfer path 140 may include generating a ranking for transferring a plurality of alimentary combinations as a function of a reduced delivery time for the plurality of alimentary combinations. User 116 may have requested an alimentary combination which may be in trouble state of "late." Computing device 104 may rank the order in which the alimentary combinations are delivered to reduce delivery time for the alimentary combinations. As an example, a trouble state of "late" due to a traffic accident may delay all deliveries of alimentary combinations from, as an example, an alimentary combination provider. As a result, a modified physical transfer path 140 may be generated that delivers first the alimentary combinations that have been delayed the longest while scheduling delivery of alimentary combinations not as late for after delivery of the alimentary combinations that have been delayed the longest. User 116 may receive an updated projected time of delivery based on a reduced delivery time for the plurality of alimentary combinations.

Alternatively or additionally, and still referring to FIG. 1A, in an embodiment, computing device 104 is configured to determine a trouble source owner 144 from a plurality of trouble source owners. As used in this disclosure, a "trouble source owner" is a person, entity, and the like who assumes responsibility for a problem and a solution to that problem. Examples include, but not limited to, alimentary combination providers, staff of alimentary combination providers, transfer party of alimentary provider combinations, users who request alimentary combinations, and the like. Trouble source training data 148 that includes past trouble source owners to past sources of trouble may be used as part of the machine-learning process. In an embodiment, a machine-learning process may be trained using the training data correlating trouble source to past trouble source owners. For example, a trouble state of "late" may associate an alimentary combination provider as an owner of the source. A trouble source of "late" may be associated with a transfer party. A trouble state of "mechanical car issues" may be associated with the transfer party. Computing device 104 may receive a trouble source state. Computing device 104 may output the trouble source owner as a function of the trouble state using the machine-learning process.

Figure 4:
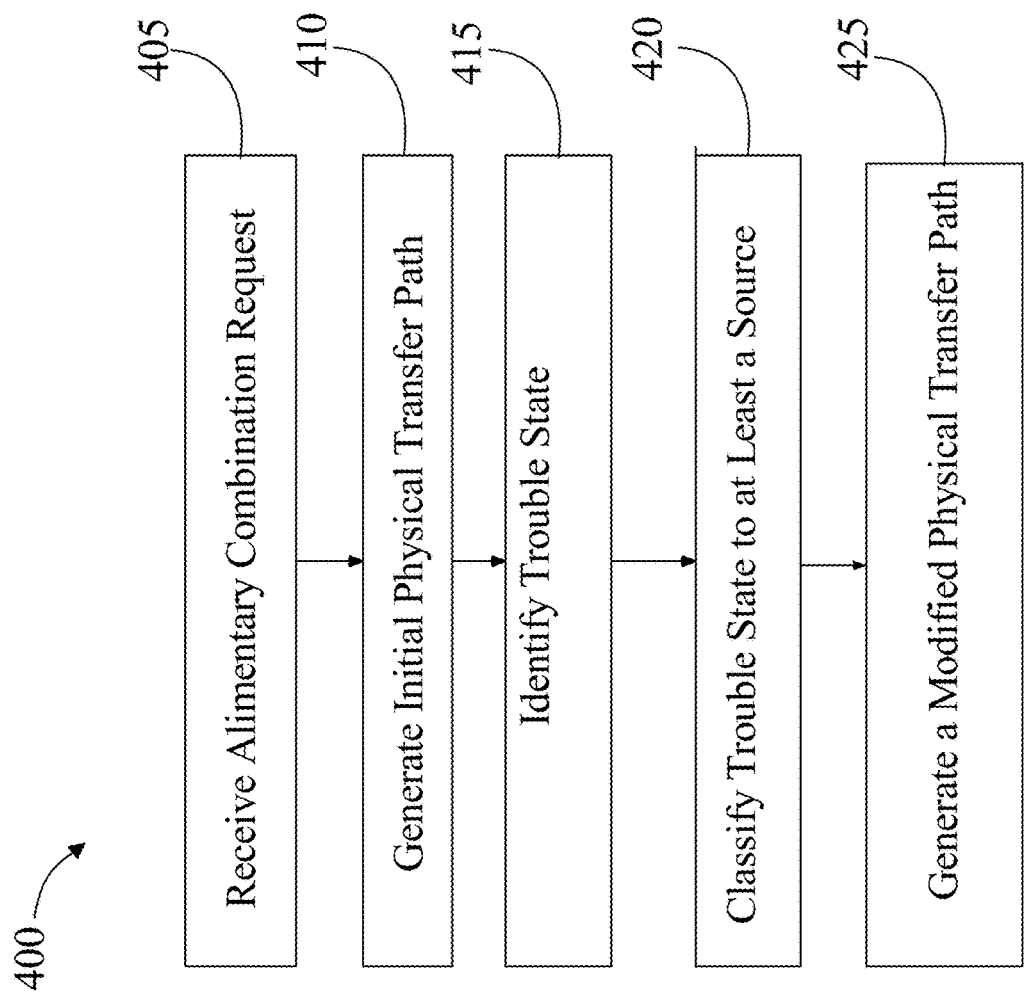
FIG. 4 is a flow diagram illustrating an exemplary embodiment of a method of generating an elementary combination help update.

Referring now to FIG. 4, an exemplary embodiment of a method 400 for generating an alimentary combination help update is illustrated. At step 405, computing device may receive a request for an alimentary combination from a user. This may be implemented, without limitation as described in FIGS. 1A-3. The request may be used to generate an initial physical transfer path.

Still referring to FIG. 4, at step 410, computing device may generate an initial physical transfer path as a function of the request for an alimentary combination. This may be implemented, without limitation, as described in FIGS. 1A-3.

Still referring to FIG. 3, at step 415, computing device may identify a trouble state as a function of the request for the alimentary combination. This may be implemented, without limitation, as described in FIGS. 1A-3. Identifying a trouble state may include determining a physical transfer route for the alimentary combination. Identifying a trouble state may include generating a predicted time of delivery as a function of the physical transfer route. Additionally, a trouble state may include computing a trouble state cause. Computing a trouble state cause includes receiving a delayed delivery notification. Additionally, computing a trouble state cause may include training a machine-learning process using trouble state cause training data correlating delayed delivery notification to a trouble state cause. Computing a trouble cause may include outputting the trouble state cause as a function of the delayed delivery notification and the machine-learning process. This may be implemented, without limitation, as described in FIGS. 1A-3.

Still referring to FIG. 4, at step 420, computing device may classify the trouble state to at least a source. Classifying the trouble state may include receiving trouble state training data, wherein the trouble state training data correlates trouble states with sources. This may be implemented, without limitation, as described in FIGS. 1A-3.

Alternatively or additionally, and still referring to FIG. 4 classifying the trouble state may include training a trouble state classifier as a function of the trouble state training data. This may be implemented, without limitation, as described in FIGS. 1A-3.

Alternatively or additionally, and still referring to FIG. 4, classifying the trouble state may include identifying the at least a source as a function of the trouble state classifier and the trouble state. This may be implemented, without limitation, as described in FIGS. 1A-3.

With continued reference to FIG. 4, the trouble state training data is updated by incorporating the user input of the trouble state into the trouble state training data. This may be implemented, without limitation, as described in FIGS. 1A-3.

Alternatively or additionally, and still referring to FIG. 4, computing device may sort the trouble state as a function of the alimentary combination. This may be implemented, without limitation, as described in FIGS. 1A-3.

Still referring to FIG. 4, at step 425, computing device may generate a modified physical transfer path as a function of the initial physical transfer path and the source. This may be implemented, without limitation, as described in FIGS. 1A-3.

With continued reference to FIG. 4, the modified physical transfer path is presented to the user as a function of a user preference. This may be implemented, without limitation, as described in FIGS. 1A-3.

Alternatively or additionally, and still referring to FIG. 4, computing device may initiate a conferencing event as a function of the modified physical transfer path. This may be implemented, without limitation, as described in FIGS. 1A-3.

With continued reference to FIG. 4, generating a modified physical transfer path may include selecting an alternate delivery route from a plurality of routes as a function of the trouble state and location of the user. Generating a modified physical transfer path may include updating the predicted time of delivery as a function of the alternate delivery route. This may be implemented, without limitation, as described in FIGS. 1A-3.

Alternatively or additionally, and still referring to FIG. 4, generating a modified physical transfer path may include selecting an alternate transfer party from a plurality of transfer parties as a function of the trouble state and location of the alternate transfer party. Generating a modified physical transfer path may include updating the predicted time of delivery as a function of the location of the alternate transfer party. This may be implemented, without limitation, as described in FIGS. 1A-3.

Alternatively or additionally, and still referring to FIG. 4, generating a modified physical transfer path may include determining an order for delivering of a plurality of alimentary combinations as a function of a reduced delivery time for the plurality of alimentary combinations. Generating a modified physical transfer path may include updating the predicted time of delivery for the plurality of alimentary. This may be implemented, without limitation, as described in FIG. 1A-.

Still referring to FIG. 4, computing device determines a trouble source owner from a plurality of trouble source owners. Determining a trouble source owner may include training a machine-learning process using the training data correlating trouble source to past trouble source owner. Determining a trouble source owner may include receiving a trouble source state; and outputting the trouble source owner as a function of the trouble state using the machine-learning process. This may be implemented, without limitation, as described in FIGS. 1A-3.

Figure 5:
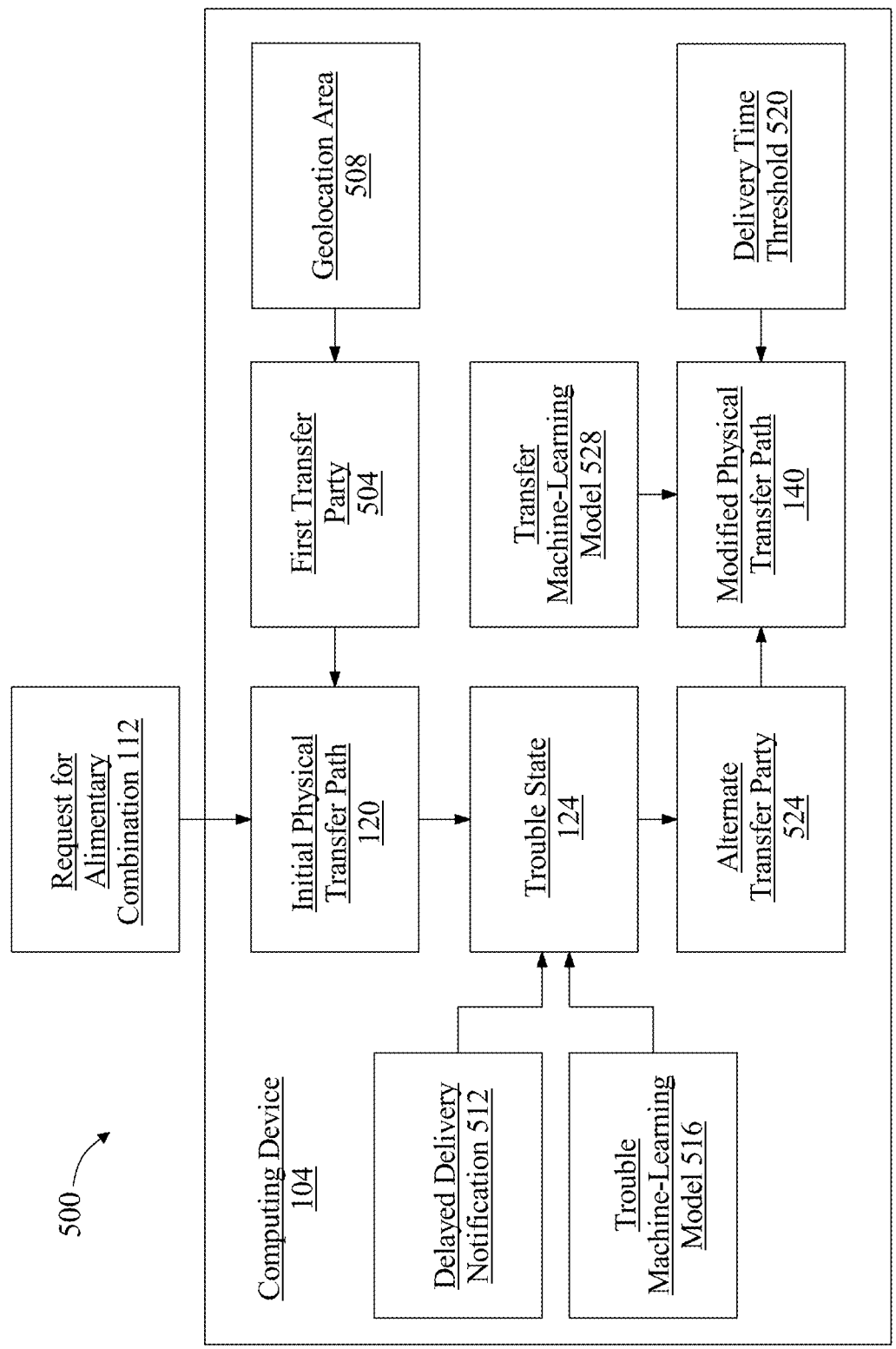
FIG. 5 is a block diagram illustrating an exemplary embodiment of a system for modifying a physical transfer path.

Now referring to FIG. 5, an exemplary embodiment of a system 200 for modifying a physical transfer path is illustrated. System 200 includes a computing device 104. Computing device 104 may include any computing device 104 as described above in reference to FIG. 1. For example and without limitation, computing device 104 may include a microcontroller, microprocessor, digital signal processor (DSP) and/or system on a chip (SoC) as described in this disclosure. Computing device 104 is configured to generate an initial physical transfer path 120. Initial physical transfer path 120 may include any initial physical transfer path 120 as described above in detail, in reference to FIG. 1. For example, and without limitation, initial physical transfer path 120 may include a path selected as a function of delivery parameters such as traffic conditions, weather, and the like thereof. In an embodiment, physical transfer path 120 may include a physical transfer route. As used in this disclosure a "physical transfer route" is a way and/or course taken to get from the pickup location to the delivery location. For example, and without limitation, physical transfer route may include a series of steps and/or directions along physical transfer path. As a further non-limiting example, physical transfer route may include a first course of direction over a first street, wherein the route then determines that the transfer party must traverse across a field and/or wooded area to deliver the alimentary combination. Computing device 104 may generate initial physical transfer path 120 as a function of receiving a request for an alimentary combination 112. Request for an alimentary combination 112 includes any of the request for an alimentary combination as described above in detail, in reference to FIG. 1. For example, and without limitation, request for an alimentary combination 112 may include a request for a user to order a pizza and/or mozzarella sticks.

Still referring to FIG. 5, computing device 104 may generate initial physical transfer path 120 as a function of determining a first transfer party 504. As used in this disclosure a "first transfer party" is a transfer party for an alimentary combination that is identified as a function of being the closest to the pickup location, wherein a transfer party is described above in detail, in reference to FIG. 1. For example, and without limitation first transfer party 504 may include transfer party that is located within 100 ft of the pickup location, wherein transfer party is the closest transfer party among the plurality of secondary transfer parties. Computing device 104 determines first transfer party 504 as a function of a geolocation area 508. As used in this disclosure a "geolocation area" is a region and/or zone of a geographical location that identifies one or more transfer parties. In an embodiment, geolocation area 508 may identify a real-world geographical location of a transfer party. For example, and without limitation, geolocation area 508 may include a first zone of New York City comprising a plurality of transfer parties in the first zone, wherein a second zone may include Long Island comprising a plurality of transfer parties in the second zone. As a further non-limiting example, geolocation area 508 may denote a first region consisting of a 500-meter square comprising a plurality of transfer parties. Geolocation area 508 may be obtained as a function of receiving a radar source from a remote device such as a mobile phone, and/or internet connected device location, wherein a "remote device," as used herein, is a device that is external to computing device 104. Geolocation area 508 may be obtained as a function of receiving an element of data from a global positioning system (GPS). Geolocation area 508 may be obtained as a function of receiving an element of data from geographic coordinates that may specify the latitude and longitude of a particular location where a pick location and/or delivery location is located. In an embodiment, computing device 104 may determine first transfer party 504 as a function of an alimentary request that denotes a user only seeks to obtain alimentary combinations within a ten-mile radius of the user.

In an embodiment, and still referring to FIG. 5, computing device 104 may generate initial physical transfer path 120 as a function of request for alimentary combination 112 and first transfer party 504 as a function of an initial machine-learning model. As used in this disclosure "initial machine-learning model" is a machine-learning model to produce an initial physical transfer path output given requests for an alimentary combinations and first transfer parties as inputs; this is in contrast to a non-machine learning software program where the commands to be executed are determined in advance by a user and written in a programming language. Initial machine-learning model may include one or more initial machine-learning processes such as supervised, unsupervised, or reinforcement machine-learning processes that computing device 104 and/or a remote device may or may not use in the determination of initial physical transfer path 120. Initial machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 5, computing device 104 may train initial machine-learning process as a function of an initial training set. As used in this disclosure an "initial training set" is a training set that correlates a request for an alimentary combination and/or a first transfer party to an initial physical transfer path. For example, and without limitation, a requests for an alimentary combination of a salad and a first transfer party of a car delivery service located 5 meters from the pickup location may relate to an initial physical transfer path of a 5-mile drive along a highway. The initial training set may be received as a function of user-entered valuations of requests for alimentary combinations, first transfer parties, and/or initial physical transfer paths. Computing device 104 may receive initial training set by receiving correlations of requests for alimentary combinations, and/or first transfer parties that were previously received and/or determined during a previous iteration of determining initial physical transfer paths. The initial training set may be received by one or more remote devices that at least correlate requests for alimentary combinations and/or first transfer parties to initial physical transfer paths. The initial training set may be received in the form of one or more user-entered correlations of requests for alimentary combinations and/or first transfer parties to initial physical transfer paths.

Still referring to FIG. 5, computing device 104 may receive initial machine-learning model from a remote device that utilizes one or more initial machine learning processes, wherein a remote device is described above in detail. For example, and without limitation, a remote device may include a computing device, external device, processor, and the like thereof. Remote device may perform the initial machine-learning process using the initial training set to generate initial physical transfer path 120 and transmit the output to computing device 104. Remote device may transmit a signal, bit, datum, or parameter to computing device 104 that at least relates to initial physical transfer path 120. Additionally or alternatively, the remote device may provide an updated machine-learning model. For example, and without limitation, an updated machine-learning model may be comprised of a firmware update, a software update, an initial machine-learning process correction, and the like thereof. As a non-limiting example a software update may incorporate a new request for an alimentary combination that relates to a modified first transfer party. Additionally or alternatively, the updated machine learning model may be transmitted to the remote device, wherein the remote device may replace the initial machine-learning model with the updated machine-learning model and determine the initial physical transfer path as a function of the request for an alimentary combination using the updated machine-learning model. The updated machine-learning model may be transmitted by the remote device and received by computing device 104 as a software update, firmware update, or corrected initial machine-learning model. For example, and without limitation initial machine-learning model may utilize a random forest machine-learning process, wherein the updated machine-learning model may incorporate a gradient boosting machine-learning process. Updated machine learning model may additionally or alternatively include any machine-learning model used as an updated machine learning model as described in U.S. Nonprovisional application Ser. No. 17/106,658, filed on Nov. 30, 2020, and entitled "A SYSTEM AND METHOD FOR GENERATING A DYNAMIC WEIGHTED COMBINATION," the entirety of which is incorporated herein by reference.

Still referring to FIG. 5, computing device 104 may produce initial physical transfer path 120 as a function of a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 5, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least one value. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 5, computing device 104 determines a trouble state 124 as a function of initial physical transfer path 120. Trouble state 124 may include any of the trouble state 124 as described above in detail, in reference to FIG. 1. In an embodiment, trouble state 124 may include a behavior or a plurality of behaviors that harms and/or interferes with the passage through initial physical transfer path 120. For example, a transfer party may encounter an unexpected traffic situation while in route to deliver the alimentary combination. As a further non-limiting example, a trouble state 124 may include a transfer party that is traveling in a vehicle that experiences mechanical problems. Computing device 104 may determine trouble state 124 as a function of receiving a delayed delivery notification 512. As used in this disclosure a "delayed delivery notification" is a signal, transmission, and/or message that conveys a message representing a delay in the passage through initial physical transfer path 120. For example, and without limitation, delayed delivery notification 512 may include a text message, phone call, email, voicemail, and the like thereof. In an embodiment delayed delivery notification 512 may include a wired and/or wireless communication. For example, delayed delivery notification may consist of one or more communications using radio waves, electric fields, mobile broadband, Wi-Fi, and/or the BLUETOOTH protocol promulgated by Bluetooth SIG, Inc. of Kirkland, Washington, wherein Bluetooth is a wireless technology used for exchanging data between fixed mobile devices over short distances using ultra high frequency radio waves between 2.402 GHz to 2.480 GHz.

Still referring to FIG. 5, computing device 104 may determine trouble state 124 as a function of delayed delivery notification 512 and initial physical transfer path 120 using a trouble machine-learning model 516. As used in this disclosure "trouble machine-learning model" is a machine-learning model to produce a trouble state output given delayed delivery notifications and initial physical transfer paths as inputs; this is in contrast to a non-machine learning software program where the commands to be executed are determined in advance by a user and written in a programming language. Trouble machine-learning model 516 may include one or more trouble machine-learning processes such as supervised, unsupervised, or reinforcement machine-learning processes that computing device 104 and/or a remote device may or may not use in the determination of trouble state 124. Trouble machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 5, computing device 104 may train trouble machine-learning process as a function of a trouble training set. As used in this disclosure an "trouble training set" is a training set that correlates a delayed delivery notification and/or an initial physical transfer path to a trouble state. For example, and without limitation, a delayed delivery notification of text message indicating the delivery will be 20 minutes late and an initial physical transfer path of a 200 km drive north may relate to a trouble state of traffic along a street. The trouble training set may be received as a function of user-entered valuations of delayed delivery notifications, initial physical transfer paths, and/or trouble states. Computing device 104 may receive trouble training set by receiving correlations of delayed delivery notifications, and/or initial physical transfer paths that were previously received and/or determined during a previous iteration of determining trouble states. The trouble training set may be received by one or more remote devices that at least correlate delayed delivery notifications and/or initial physical transfer paths to trouble states. The trouble training set may be received in the form of one or more user-entered correlations of delayed delivery notifications and/or initial physical transfer paths to trouble states.

Still referring to FIG. 5, computing device 104 may receive trouble machine-learning model 516 from a remote device that utilizes one or more trouble machine learning processes, wherein a remote device is described above in detail. For example, and without limitation, a remote device may include a computing device, external device, processor, and the like thereof. Remote device may perform the trouble machine-learning process using the trouble training set to generate trouble state 124 and transmit the output to computing device 104. Remote device may transmit a signal, bit, datum, or parameter to computing device 104 that at least relates to trouble state 124. Additionally or alternatively, the remote device may provide an updated machine-learning model. For example, and without limitation, an updated machine-learning model may be comprised of a firmware update, a software update, a trouble machine-learning process correction, and the like thereof. As a non-limiting example a software update may incorporate a new delayed delivery notification that relates to a modified initial physical transfer path. Additionally or alternatively, the updated machine learning model may be transmitted to the remote device, wherein the remote device may replace the trouble machine-learning model with the updated machine-learning model and determine the trouble state as a function of the delayed delivery notification using the updated machine-learning model. The updated machine-learning model may be transmitted by the remote device and received by computing device 104 as a software update, firmware update, or corrected trouble machine-learning model. For example, and without limitation trouble machine-learning model may utilize a random forest machine-learning process, wherein the updated machine-learning model may incorporate a gradient boosting machine-learning process. Updated machine learning model may additionally or alternatively include any machine-learning model used as an updated machine learning model as described in U.S. Nonprovisional application Ser. No. 17/106,658. Additionally or alternative, trouble machine-learning model may utilize a classier to determine trouble state 124, wherein a classifier is described in detail above.

In an embodiment, computing device 104 may determine trouble state 124 as a function of identifying a trouble area. As used in this disclosure a "trouble area" is a geolocation area that has a propensity and/or history for causing delays. For example, and without limitation, trouble area may consist of a public road and/or private street that has a history of heavy traffic. As a further non-limiting example, trouble area may include a geolocation area that contains an active shooter. As a further non-limiting example, trouble area may include a geolocation area that has a high population of individuals. In an embodiment, trouble area may be identified as a function of a real time traffic monitor signal. For example, and without limitation, real time traffic monitor signal may include one or more traffic reporting websites, traffic reporting news broadcasts, traffic reporting services, and the like thereof. Additionally or alternatively, computing device 104 may determine trouble state 124 as a function of identifying a trouble source owner. Trouble source owner may include any of the trouble source owner as described above in detail in reference to FIG. 1. For example, and without limitation, trouble source owner may include an individual and/or entity that assumes responsibility for the delayed delivery notification, such as but not limited to, alimentary combination providers, first transfer party 504, users that request the alimentary combination, and the like thereof.

Still referring to FIG. 5, computing device 104 is configured to produce a modified physical transfer path 140 as a function of trouble state 124. Modified physical transfer path 140 includes any of modified physical transfer path 140 as described above in detail, in reference to FIG. 1. For example, and without limitation, modified physical transfer path 140 may include an alternate route and/or direction to traverse to deliver the alimentary combination. Computing device 104 produces modified physical transfer path 140 as a function of receiving a delivery time threshold 520. As used in this disclosure a "delivery time threshold" is a maximum amount of time that a transfer party has to deliver the alimentary combination. For example, and without limitation, delivery time threshold may be a value of 30 minutes, wherein the transfer party has a maximum amount of time consisting of 30 minutes. As a further non-limiting example, delivery time threshold may be a value of 2 hours, wherein the transfer party has a maximum amount of time consisting of 2 hours. In an embodiment, delivery time threshold may be correlated to the distance a transfer party has to travel from the pickup location to the delivery location. In yet another embodiment, delivery time threshold may be correlated to a spoilage element. As used in this disclosure a "spoilage threshold" is a maximum amount of time prior to the alimentary combination degrading and/or becoming rancid. For example, and without limitation spoilage threshold may denote that berries should not take longer than 4 hours. In yet another embodiment, delivery time threshold may be correlated to a temperature element. As used in this disclosure a "temperature threshold" is a maximum amount of temperature change allowed prior to the alimentary combination degrading and/or becoming rancid. For example, and without limitation, temperature threshold may denote that milk should not exceed a temperature of 120° C. during the delivery.

Still referring to FIG. 5, computing device produced modified physical transfer path 140 as a function of identifying an alternate transfer party 524. As used in this disclosure an "alternate transfer party" is a transfer party that is different and/or distinct from the first transfer party. For example, and without limitation, alternate transfer party 524 may include a courier service, and/or transfer service that is not related to and/or associated with first transfer party 504. As a further non-limiting example, alternate transfer party 524 may include one or more differing transfer mechanisms such as walking and/or biking, wherein the first transfer party consisted of a delivery service as a function of automobiles. Computing device 104 identifies alternate transfer party 524 as a function of trouble state 124. For example, and without limitation, a trouble state of traffic in a first geolocation area may denote that alternate transfer party 524 should be located outside of the traffic and/or trouble area. As a further non-limiting example, a trouble state of mechanical issues may denote that alternate transfer party should be free of mechanical issues and capable of completing the transfer. In an embodiment, and without limitation, computing device 104 may identify alternate transfer party 524 as a function of locating an available party. As used in this disclosure an "available party" is a party that is capable of performing the transfer. For example, and without limitation, available party may include a transfer party that does not have any pending transfer and/or delivery requests. As a further non-limiting example, available party may include a transfer party that has extra space and/or room in their delivery vehicle to aid first transfer party 504. As a further non-limiting example, available party may include a transfer party that is already traveling towards a similar delivery location. In an embodiment, available party may be located in geolocation area 508. For example, and without limitation, first transfer party 504 may be located in a first geolocation area, wherein available party is also located within geolocation area 508.

In an embodiment, and still referring to FIG. 5, computing device 104 may identify alternate transfer party 524 as a function of locating a proximal geolocation area. As used in this disclosure a "proximal geolocation area" is a location that is adjacent to and/or near geolocation area 508. For example, and without limitation, proximal geolocation area may be an area that is directly east of geolocation area 508, wherein proximal geolocation area and geolocation area 508 share a similar border. Computing device 104 may determine a plurality of proximal transfer parties as a function of proximal geolocation area. For example, and without limitation, computing device may determine 15 proximal transfer parties in a proximal geolocation area that is directly west of geolocation area 508, wherein proximal geolocation area and geolocation area 508 share a similar border. Computing device 104 may locate alternate transfer party 524 as a function of the plurality of proximal transfer parties and the trouble state. For example, and without limitation, computing device 104 may locate an alternate transfer party as a function of determining that there are 31 proximal transfer parties 5 miles north of geolocation 508, wherein a trouble state exists including heavy traffic in geolocation area 508 in the south preventing first transfer party 504 from reaching the northmost region of geolocation area 508. As a further non-limiting example, computing device 104 may locate an alternate transfer party as a function of determining that proximal geolocation area has a surplus of proximal transfer parties, wherein geolocation area 508 has a shortage of transfer parties, wherein computing device may dynamically adjust and/or shift geolocation area 508 to include the boundaries of proximal geolocation area.

Still referring to FIG. 5, computing device 104 produces modified physical transfer path as a function of delivery time threshold 520 and alternate transfer party 524 using a transfer machine-learning model 528. As used in this disclosure "transfer machine-learning model" is a machine-learning model to produce a modified physical transfer path output given delivery time thresholds and alternate transfer parties as inputs; this is in contrast to a non-machine learning software program where the commands to be executed are determined in advance by a user and written in a programming language. Transfer machine-learning model 528 may include one or more transfer machine-learning processes such as supervised, unsupervised, or reinforcement machine-learning processes that computing device 104 and/or a remote device may or may not use in the determination of modified physical transfer path 140. Transfer machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 5, computing device 104 may train transfer machine-learning process as a function of a transfer training set. As used in this disclosure an "transfer training set" is a training set that correlates a delivery time threshold and/or an alternate transfer party to a modified physical transfer path. For example, and without limitation, a delivery time threshold of 20 minutes and an alternate transfer party that is located 2 miles from the first transfer party may relate to a modified physical transfer path of the alternate transfer party driving to the first transfer party and completing the delivery. The transfer training set may be received as a function of user-entered valuations of delivery time thresholds, alternate transfer parties, and/or modified physical transfer paths. Computing device 104 may receive transfer training set by receiving correlations of delivery time thresholds, and/or alternate transfer parties that were previously received and/or determined during a previous iteration of determining modified physical transfer paths. The transfer training set may be received by one or more remote devices that at least correlate delivery time thresholds and/or alternate transfer parties to modified physical transfer paths. The transfer training set may be received in the form of one or more user-entered correlations of delivery time thresholds and/or alternate transfer parties to modified physical transfer paths.

Still referring to FIG. 5, computing device 104 may receive transfer machine-learning model 528 from a remote device that utilizes one or more transfer machine learning processes, wherein a remote device is described above in detail. For example, and without limitation, a remote device may include a computing device, external device, processor, and the like thereof. Remote device may perform the transfer machine-learning process using the transfer training set to generate modified physical transfer path 140 and transmit the output to computing device 104. Remote device may transmit a signal, bit, datum, or parameter to computing device 104 that at least relates to modified physical transfer path 140. Additionally or alternatively, the remote device may provide an updated machine-learning model. For example, and without limitation, an updated machine-learning model may be comprised of a firmware update, a software update, a transfer machine-learning process correction, and the like thereof. As a non-limiting example a software update may incorporate a new delivery time threshold that relates to a modified alternate transfer party. Additionally or alternatively, the updated machine learning model may be transmitted to the remote device, wherein the remote device may replace the transfer machine-learning model with the updated machine-learning model and determine the modified physical transfer path as a function of the delivery time threshold using the updated machine-learning model. The updated machine-learning model may be transmitted by the remote device and received by computing device 104 as a software update, firmware update, or corrected transfer machine-learning model. For example, and without limitation transfer machine-learning model may utilize a random forest machine-learning process, wherein the updated machine-learning model may incorporate a gradient boosting machine-learning process. Updated machine learning model may additionally or alternatively include any machine-learning model used as an updated machine learning model as described in U.S. Nonprovisional application Ser. No. 17/106,658. Additionally or alternative, transfer machine-learning model may utilize a classier to determine modified physical transfer path 140, wherein a classifier is described in detail above.

In an embodiment, and still referring to FIG. 5, computing device 104 may produce modified physical transfer path 140 as a function of generating an estimated delivery score. As used in this disclosure an "estimated delivery score" is a measurable value associated with the capability for a transfer to be completed within the delivery time threshold. For example, and without limitation, an estimated delivery score may be 90 for a transfer that is estimated to be completed in 20 minutes, wherein the delivery time threshold is 1 hour. As a further non-limiting example, an estimated delivery score may be 10 for a transfer that is estimated to be completed in 35 minutes, wherein the delivery time threshold is 40 minutes. As a further non-limiting example, an estimated delivery score may be 0 for a transfer that is estimated to be completed in 52 minutes, wherein the delivery time threshold is 30 minutes. In an embodiment, computing device 104 may generate estimated delivery score as a function of identifying a projected delivery time. As used in this disclosure a "projected delivery time" is a measurable value representing a time period required to courier the alimentary combination from the pickup location to the delivery location, wherein a time period may include, without limitation, seconds, minutes, hours, days, weeks, months, years, and the like thereof. For example, and without limitation projected delivery time may include 20 minutes to deliver a pizza. As a further non-limiting example, projected delivery time may include 3 days to deliver stone crab claws from another state. In an embodiment, projected delivery time may be identified as a function of one or more traffic patterns, weather patterns, and/or congestion predictions, transfer party reliability metrics, and the like thereof.

Still referring to FIG. 5, computing device 104 may generate estimated delivery score as a function of projected delivery time delivery time threshold 520 using a time machine-learning model. As used in this disclosure "time machine-learning model" is a machine-learning model to produce an estimated delivery score output given delivery time thresholds and projected delivery times as inputs; this is in contrast to a non-machine learning software program where the commands to be executed are determined in advance by a user and written in a programming language. Time machine-learning model may include one or more time machine-learning processes such as supervised, unsupervised, or reinforcement machine-learning processes that computing device 104 and/or a remote device may or may not use in the determination of estimated delivery score 140. Time machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 5, computing device 104 may train time machine-learning process as a function of a time training set. As used in this disclosure an "time training set" is a training set that correlates a delivery time threshold and/or a projected delivery timey to an estimated delivery score. For example, and without limitation, a delivery time threshold of 20 minutes and a projected delivery time of 30 minutes due to a transfer parties mechanical breakdown history may relate to an estimated delivery score of 0. The time training set may be received as a function of user-entered valuations of delivery time thresholds, projected delivery times, and/or estimated delivery scores. Computing device 104 may receive time training set by receiving correlations of delivery time thresholds, and/or projected delivery times that were previously received and/or determined during a previous iteration of determining estimated delivery scores. The time training set may be received by one or more remote devices that at least correlate delivery time thresholds and/or projected delivery times to estimated delivery scores. The time training set may be received in the form of one or more user-entered correlations of delivery time thresholds and/or projected delivery times to estimated delivery scores.

Still referring to FIG. 5, computing device 104 may receive time machine-learning model from a remote device that utilizes one or more time machine learning processes, wherein a remote device is described above in detail. For example, and without limitation, a remote device may include a computing device, external device, processor, and the like thereof. Remote device may perform the time machine-learning process using the time training set to generate estimated delivery score and transmit the output to computing device 104. Remote device may transmit a signal, bit, datum, or parameter to computing device 104 that at least relates to estimated delivery score. Additionally or alternatively, the remote device may provide an updated machine-learning model. For example, and without limitation, an updated machine-learning model may be comprised of a firmware update, a software update, a time machine-learning process correction, and the like thereof. As a non-limiting example a software update may incorporate a new delivery time threshold that relates to a modified projected delivery timey. Additionally or alternatively, the updated machine learning model may be transmitted to the remote device, wherein the remote device may replace the time machine-learning model with the updated machine-learning model and determine the estimated delivery score as a function of the delivery time threshold using the updated machine-learning model. The updated machine-learning model may be transmitted by the remote device and received by computing device 104 as a software update, firmware update, or corrected time machine-learning model. For example, and without limitation time machine-learning model may utilize a random forest machine-learning process, wherein the updated machine-learning model may incorporate a gradient boosting machine-learning process. Updated machine learning model may additionally or alternatively include any machine-learning model used as an updated machine learning model as described in U.S. Nonprovisional application Ser. No. 17/106,658. Additionally or alternative, time machine-learning model may utilize a classier to determine estimated delivery score, wherein a classifier is described in detail above.

In an embodiment, and still referring to FIG. 5, computing device 104 may produce modified physical transfer path 140 as a function of deactivating a first geolocation area as a function of the trouble area. For example, and without limitation, a first geolocation area may be deactivated as a function of an active shooter. As a further non-limiting example, a first geolocation area may be deactivated as a function of a car accident and/or traffic. As a further non-limiting example, a first geolocation area may be deactivated as a function of a flood and/or unforeseen weather patterns. Computing device 104 may produce modified physical transfer path 140 as a function of the deactivated first geolocation area to at least avoid the first geolocation area. For example, computing device 104 may modify the physical transfer path to add an additional 5 miles to the transfer route, wherein the additional 5 miles avoids the deactivated first geolocation area. Additionally or alternatively, computing device 104 may produce modified physical transfer path 140 as a function of deactivating first transfer party 504 from an active status to an inactive status. For example, and without limitation, an active status may include a status denoting that the transfer party is actively transferring and/or delivering alimentary food combinations, wherein due to a mechanical breakdown and/or car accident the computing device may deactivate first transfer party 504 to denote an inactive status. Computing device 104 may activate alternate transfer party 524 from an inactive status to an active status. For example, and without limitation, an inactive status may include a status denoting that the alternate transfer party was not actively transferring and/or delivering alimentary food combinations, wherein due to the deactivation of first transfer party alternate transfer party should be activated to transfer alimentary combinations. Computing device 104 may produce modified physical transfer path 140 as a function of the activated alternate transfer party 524. For example, and without limitation, computing device 104 may modified the transfer path as a function of the location of the activated alternate transfer party and/or the capabilities of the alternate transfer party, wherein the capabilities associated with the means of transferring the alimentary combinations include, but are not limited to, capabilities associated with the availability of automobiles, aircrafts, sea vessels, bicycles, vehicles, and the like thereof.

Figure 6:
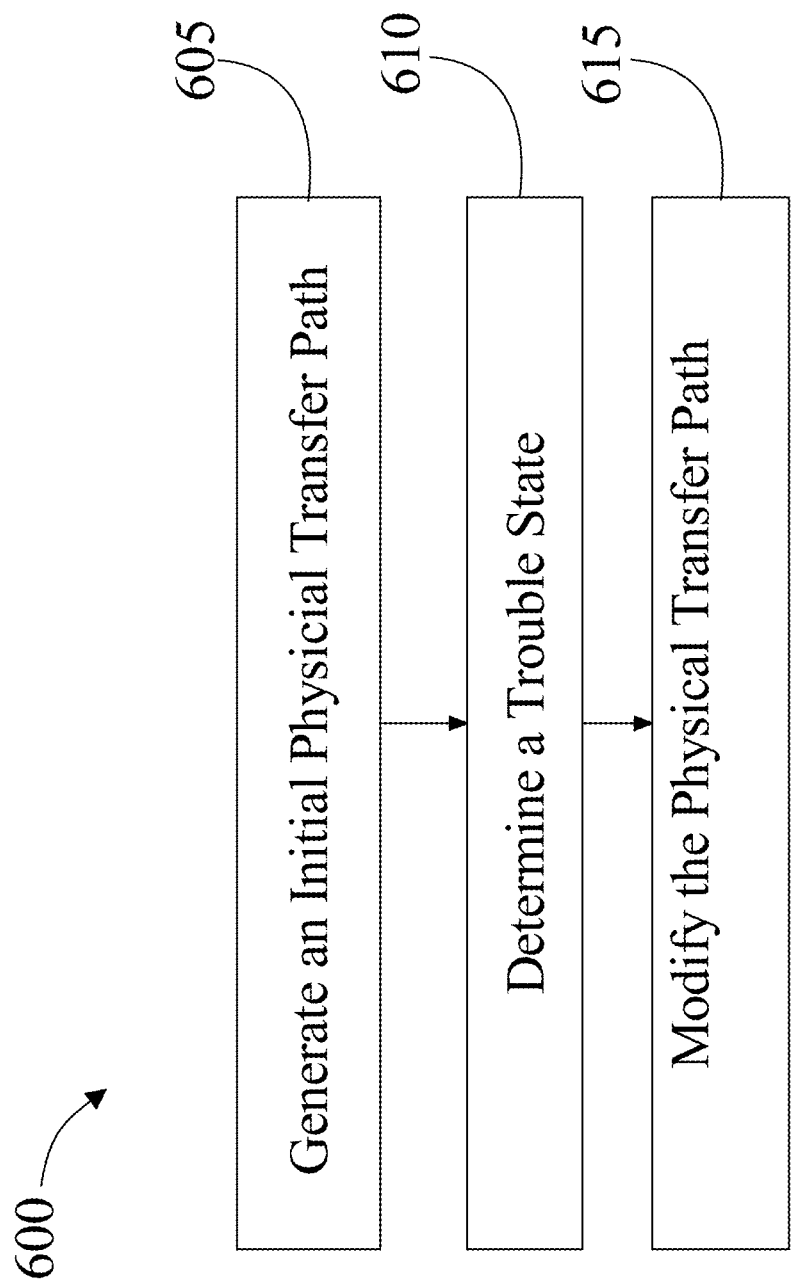
FIG. 6 is a flow diagram illustrating an exemplary embodiment of a method for modifying a physical transfer path.

Now referring to FIG. 6, an exemplary embodiment of a method 600 for modifying a physical transfer path is illustrated. At step 605, a computing device 104 generates an initial physical transfer path 120. Computing device 104 includes any of the computing device 104 as described above in detail, in reference to FIGS. 1-5. Initial physical transfer path 120 includes any of the initial physical transfer path 120 as described above in detail, in reference to FIGS. 1-5. Computing device 104 generates initial physical transfer path 120 as a function of receiving a request for an alimentary combination 112. Request for an alimentary combination 112 includes any of the request for an alimentary combination 112 as described above, in reference to FIGS. 1-5. Computing device 104 generates initial physical transfer path 120 by determining a first transfer party 504 as a function of a geolocation area 508. First transfer party 504 includes any of the first transfer party 504 as described above in detail, in reference to FIGS. 1-5. Geolocation area 508 includes any of the geolocation area 508 as described above in detail, in reference to FIGS. 1-5.

Still referring to FIG. 6, at step 610, computing device 104 determines a trouble state 124 as a function of initial physical transfer path 120. Trouble state 124 includes any of the trouble state 124 as described above in detail, in reference to FIGS. 1-5. Computing device 104 determines trouble state 124 as a function of receiving a delayed delivery notification 512. Delayed delivery notification 512 includes any of the delayed delivery notification 512 as described above in detail in reference to FIGS. 1-5. Computing device 104 determines trouble state 124 as a function of delayed delivery notification 512 and initial physical transfer path 120 using a trouble machine-learning model 516. Trouble machine-learning model 516 includes any of the trouble machine-learning model 516 as described above in detail, in reference to FIGS. 1-5.

Still referring to FIG. 6, at step 615, computing device 14 produces a modified physical transfer path 140 as a function of trouble state 124. Modified physical transfer path 140 includes any of the modified physical transfer path 140 as described above in detail, in reference to FIGS. 1-5. Computing device 104 produces modified physical transfer path 140 as a function of receiving a delivery time threshold 520. Delivery time threshold 520 includes any of the delivery time threshold 520 as described above in detail, in reference to FIGS. 1-5. Computing device 104 produces modified physical transfer path 140 as a function of identifying an alternate transfer party 524 as a function of trouble state 124. Alternate transfer party 524 includes any of the alternate transfer party 524 as described above, in reference to FIGS. 1-5. Computing device 104 produces modified physical transfer party 140 as a function of delivery time threshold 520 and alternate transfer party 524 using a transfer machine-learning model 528. Transfer machine-learning model 528 includes any of the transfer machine-learning model 528 as described above in detail, in reference to FIGS. 1-5.

It is to be noted that any one or more of the aspects and embodiments described herein may be conveniently implemented using one or more machines (e.g., one or more computing devices that are utilized as a user computing device 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device 104) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device 104) and any related information (e.g., data structures and data) that causes the machine to perform any one of the methodologies and/or embodiments described herein.

Examples of a computing device 104 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 104 may include and/or be included in a kiosk.

Figure 7:
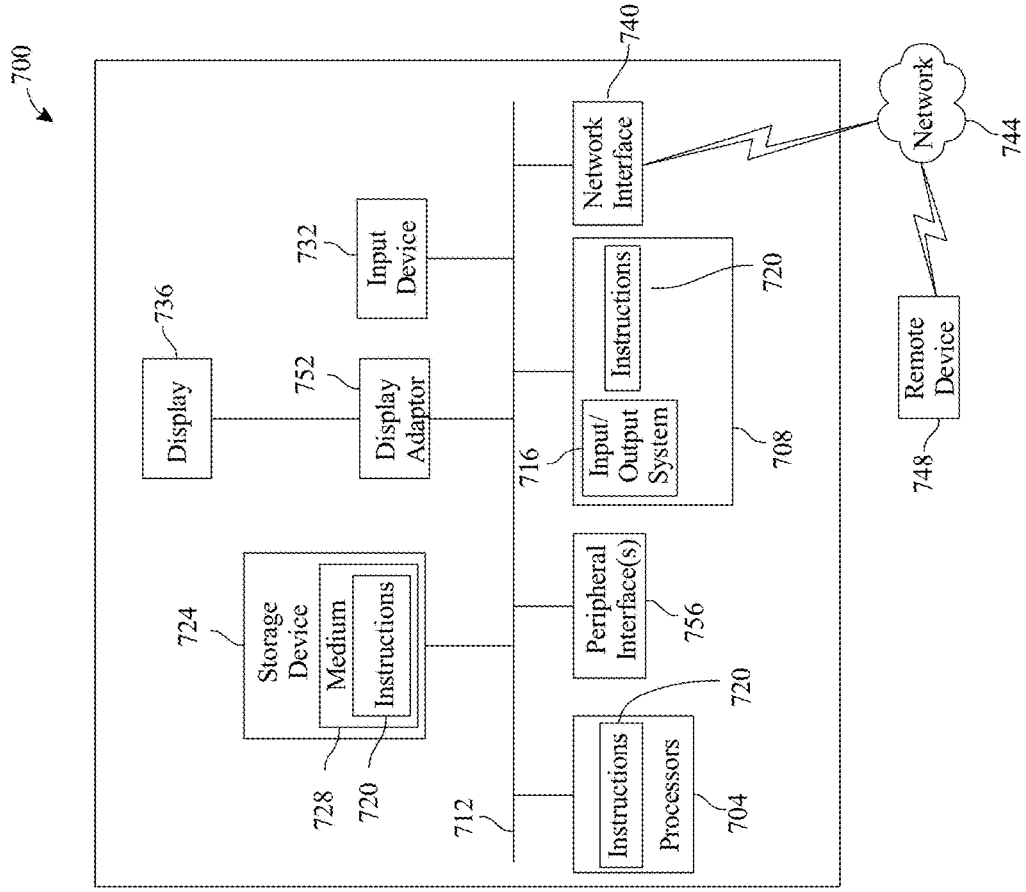
FIG. 7 is a block diagram of a computing system that can be used to implement any one or more of the methodologies disclosed herein and any one or more portions thereof.

FIG. 7 shows a diagrammatic representation of one embodiment of a computing device 104 in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for modifying a physical transfer path, the system comprising:
 a computing device, wherein the computing device is configured to:
 generate an initial physical transfer path, wherein generating further comprises:
  receiving a request for an alimentary combination;
  determining a first transfer party as a function of a geolocation area; and
  generating the initial physical transfer path as a function of the request for an alimentary combination and the first transfer party;
 determine a trouble state as a function of the initial physical transfer path; and
 produce a modified physical transfer path as a function of the trouble state, wherein producing further comprises:
  receiving a delivery time threshold wherein the delivery time threshold is correlated to at least a spoilage threshold comprising a maximum amount of time prior to the degradation of the alimentary combination;
  identifying an alternate transfer party as a function of the trouble state; and
  producing the modified physical transfer path as a function of the delivery time threshold and the alternate transfer party using a transfer machine-learning model.

2. The system of claim 1, wherein determining the trouble state further comprises:
 receiving a delayed delivery notification; and
 determining the trouble state as a function of the delayed delivery notification and the initial physical transfer path using a trouble machine-learning model.

3. The system of claim 1, wherein determining the trouble state further comprises identifying a trouble area and determining the trouble state as a function of the trouble area.

4. The system of claim 3, wherein producing the modified physical transfer path further comprises:
 deactivating a first geolocation area as a function of the trouble area; and
 producing the modified physical transfer path as a function of the deactivated first geolocation area.

5. The system of claim 1, wherein determining the trouble state further comprises identifying a trouble source owner and determining the trouble state as a function of the trouble source owner.

6. The system of claim 1, wherein identifying the alternate transfer party further comprises locating an available party and identifying the alternate transfer party as a function of the available party.

7. The system of claim 1, wherein identifying the alternate transfer party further comprises:
 locating a proximal geolocation area;
 determining a plurality of proximal transfer parties as a function of the proximal geolocation area; and
 locating the alternate transfer party as a function of the plurality of proximal transfer parties and the trouble state.

8. The system of claim 1, wherein producing the modified physical transfer path further comprises generating an estimated delivery score.

9. The system of claim 8, wherein generating the estimated delivery score further comprises:
 identifying a projected delivery time; and
 generating the estimated delivery score as a function of the projected delivery time and the delivery time threshold using a time machine-learning model.

10. The system of claim 1, wherein producing the modified physical transfer path further comprises:
 deactivating the first transfer party from an active status to an inactive status;
 activating the alternate transfer party from an inactive status to an active status; and
 producing the modified physical transfer path as a function of the activated alternate transfer party.

11. A method for modifying a physical transfer path, the method comprising:
 generating, by a computing device, an initial physical transfer path, wherein generating further comprises:
  receiving a request for an alimentary combination;
  determining a first transfer party as a function of a geolocation area; and
  generating the initial physical transfer path as a function of the request for an alimentary combination and the first transfer party;
 determining, by the computing device, a trouble state as a function of the initial physical transfer path; and producing, by the computing device, a modified physical transfer path as a function of the trouble state, wherein producing further comprises:
receiving a delivery time threshold wherein the delivery time threshold is correlated to at least a spoilage threshold comprising a maximum amount of time prior to the degradation of the alimentary combination;
identifying an alternate transfer party as a function of the trouble state; and
producing the modified physical transfer path as a function of the delivery time threshold and the alternate transfer party using a transfer machine-learning model.

12. The method of claim 11, wherein determining the trouble state further comprises:
receiving a delayed delivery notification; and
determining the trouble state as a function of the delayed delivery notification and the initial physical transfer path using a trouble machine-learning model.

13. The method of claim 11, wherein determining the trouble state further comprises identifying a trouble area and determining the trouble state as a function of the trouble area.

14. The method of claim 13, wherein producing the modified physical transfer path further comprises:
deactivating a first geolocation area as a function of the trouble area; and
producing the modified physical transfer path as a function of the deactivated first geolocation area.

15. The method of claim 11, wherein determining the trouble state further comprises identifying a trouble source owner and determining the trouble state as a function of the trouble source owner.

16. The method of claim 11, wherein identifying the alternate transfer party further comprises locating an available party and identifying the alternate transfer party as a function of the available party.

17. The method of claim 11, wherein identifying the alternate transfer party further comprises:
locating a proximal geolocation area;
determining a plurality of proximal transfer parties as a function of the proximal geolocation area; and
locating the alternate transfer party as a function of the plurality of proximal transfer parties and the trouble state.

18. The method of claim 11, wherein producing the modified physical transfer path further comprises generating an estimated delivery score.

19. The method of claim 18, wherein generating the estimated delivery score further comprises:
identifying a projected delivery time; and
generating the estimated delivery score as a function of the projected delivery time and the delivery time threshold using a time machine-learning model.

20. The method of claim 11, wherein producing the modified physical transfer path further comprises:
deactivating the first transfer party from an active status to an inactive status;
activating the alternate transfer party from an inactive status to an active status; and
producing the modified physical transfer path as a function of the activated alternate transfer party.

* * * * *